May 7, 1935.  W. R. DAVIES  2,000,826
ELECTRICAL HEATER
Filed July 21, 1934   3 Sheets-Sheet 1

Inventor
W. R. Davies
By Clarence A. O'Brien
Attorney

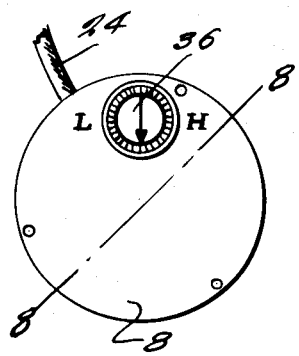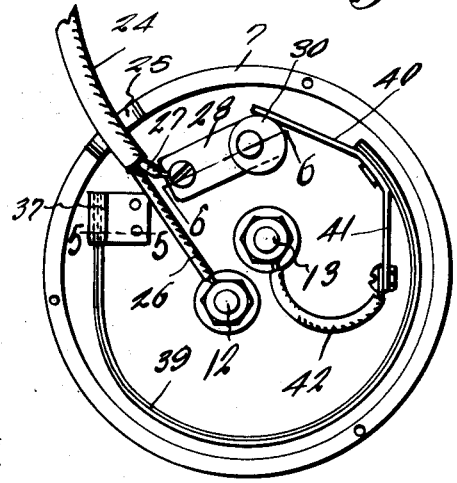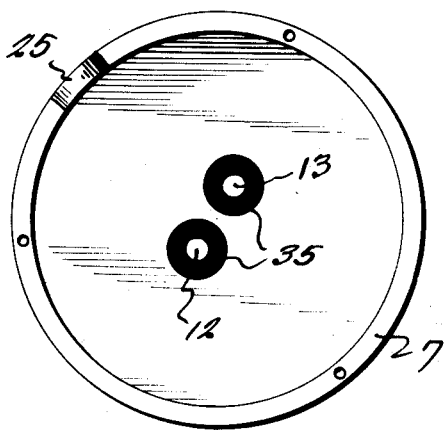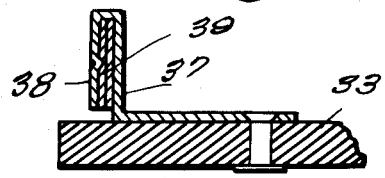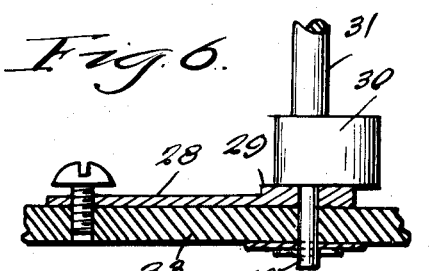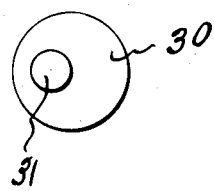

May 7, 1935. W. R. DAVIES 2,000,826
ELECTRICAL HEATER
Filed July 21, 1934 3 Sheets-Sheet 3
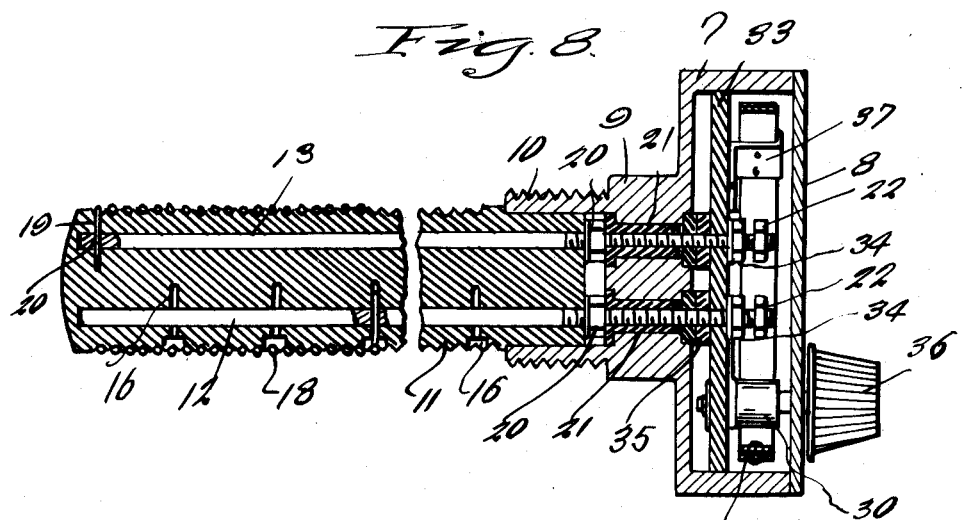
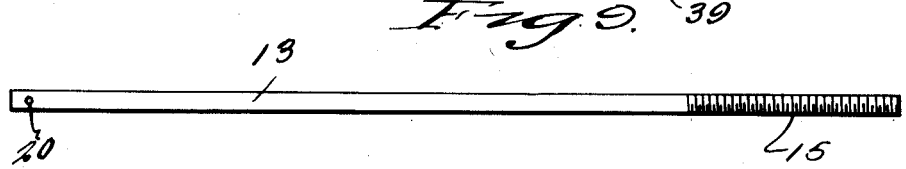
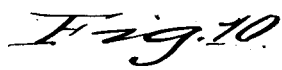
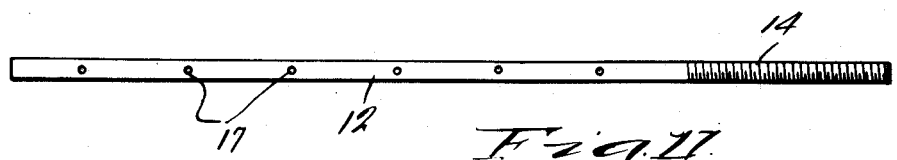
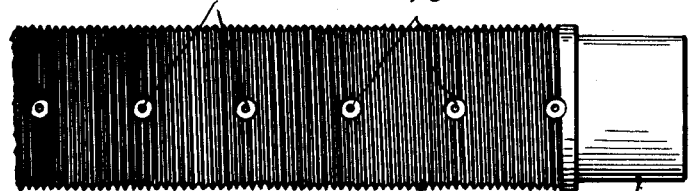
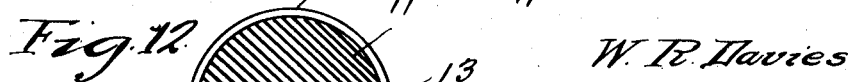
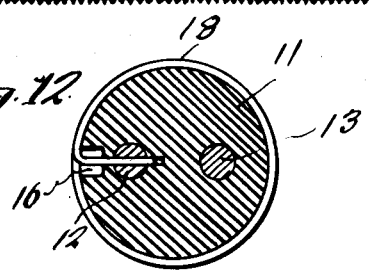
Inventor
W. R. Davies
By Clarence A. O'Brien
Attorney Patented May 7, 1935

2,000,826

UNITED STATES PATENT OFFICE 2,000,826

ELECTRICAL HEATER

Walter R. Davies, Missoula, Mont.

Application July 21, 1934, Serial No. 736,401

2 Claims. (Cl. 219—38)

This invention apertains to new and useful improvements in electrical heating, the same being an improvement over my co-pending application Serial No. 675,629, filed June 13, 1933.

The principal object of the present invention is to provide a liquid heater for boilers, tanks, crank cases and other containers wherein the wattage can be varied from approximately one hundred watts to three thousands by a simple manner of connecting the heating element with the current supply.

Another important object of the present invention is to provide an electrical heater involving a thermostatic switch for cutting off the heater at a predetermined temperature wherein the thermostatic switch is conveniently located and capable of being minutely adjusted.

These and various other important objects and advantages of the invention will become apparent to the reader of the following specification.

In the drawings:

Figure 3 is an end elevational view the cover removed showing the thermostatic switch.

Figure 4 is an end elevational view of the device showing the housing of the thermostatic switch with the elements removed.

Figure 5 is an enlarged fragmentary detailed sectional view taken substantially on line 5—5 of Figure 3.

Figure 6 is an enlarged fragmentary detailed sectional view taken substantially on line 6—6 of Figure 3.

Figure 7 is an elevational view of the cam contact.

Figure 8 is a longitudinal sectional view taken substantially on line 8—8 of Figure 13.

Figure 9 is a side elevational view of one of the conductor rods.

Figure 10 is a side elevational view of the other conductor rod which also functions as the heating element retainer.

Figure 11 is a side elevational view of the core.

Figure 12 is a cross sectional view taken substantially on line 12—12 of Figure 2.

Figure 13 is an elevational view of the outer end of the heater.

Figure 1:
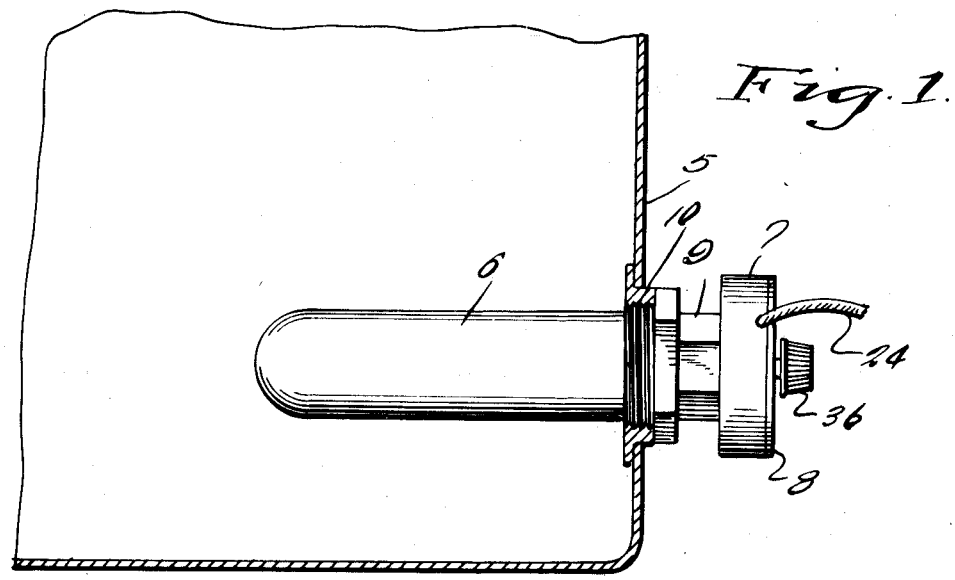
Figure 1 is a fragmentry vertical sectional view through a crank case showing the heater installed thereon.
Figure 2:
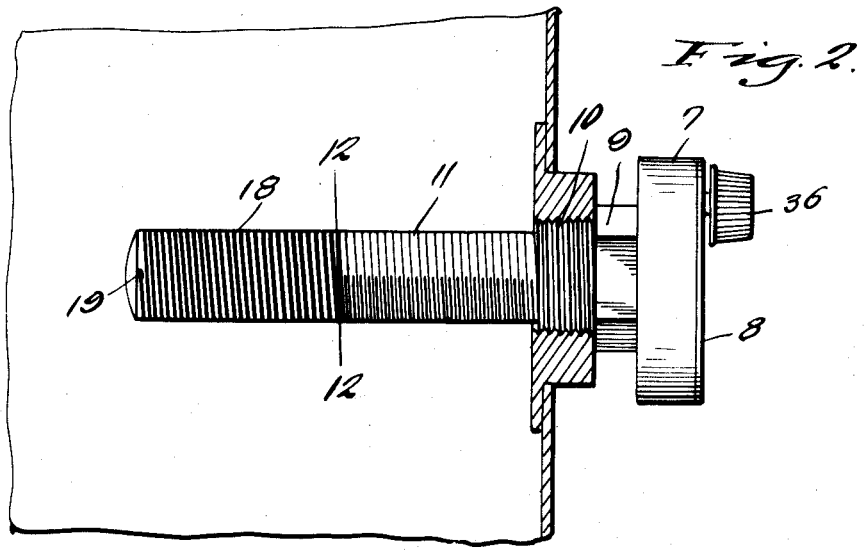
Figure 2 is a fragmentary vertical sectional view through a liquid tank showing the heater installed therewith, the element being exposed when in use with non-inflammable liquid.

Referring to the drawings wherein like numerals designate like parts, it can be seen that Figure 1 shows the device used in conjunction with an automobile crank case 5, and in this connection a shell 6 is employed to enclose the core and heating element to protect the oil content of the case 5 from reaching the heating element, the oil of course being inflammable.

The heater construction consists of an annular housing 7 provided with a removable front cover 8 and a polygonal shaped body 9 extending from its rear wall and provided with a threaded extension 10, which is hollow to form a socket for the smooth inner end portion of the threaded dielectric core 11.

This core 11 is provided with a pair of parallel longitudinally extending bores therein receiving the elongated rods 12—13 provided with the threaded end portions 14 and 15, respectively.

Extending diametrically into the core 11 and being longitudinally spaced along the core are the openings or small bores 16 with which the transverse openings 17 in the rod 12 are registrable.

It will be observed that the heating element 18 has one end disposed into the opening 19 and through the opening 20 in the end of the rod 13, the element being wound around in the thread grooves until the proper wattage is afforded, when the remaining end of the wire is inserted into the corresponding bore 16 and passed through the corresponding opening 17 in the rod 13. The nuts 20 on the threaded portions of the rods 12 and 13 are adapted to be fed on the threaded portions and against the inner end of the core 11 so as to tend to pull the rods 12 and 13 upwardly. In this manner the rods serve to retain the ends of the wound heating element 18 so that it will be maintained in convoluted form on the core.

Insulation lined openings 21 extend through the body 9 of the housing 7 and through these alined openings extend the threaded portions of the rods 12 and 13. Binding nuts 22 and 23 are provided on the ends of the rods 12 and 13 located in the housing 7.

As can be seen in Figure 3, the current supply line 24 extends through a notch 25 in the edge portion of the housing 7 and has one of its conductors 26 connected to the rod 12 while the other conductor 27 is secured to the plate 28 which, as shown in Figure 6 is provided with an outstanding portion 29 against which one end of the cam contact 30 rides. Numeral 31 represents a shaft on which the cam 30 is eccentrically mounted, numeral 32 representing a pin extending from the cam contact and through the prominence 29 and di-electric partition 33, this partition being supported in the housing 7 by having openings therein through which the threaded portions of the rods 12 and 13 extend and having jamb nuts 34 on the rods 12 and 13 for holding the partition firmly against the di-electric spacers or washers 35 located on the threaded portions of the rods 12 and 13.

The shaft 31 extends through the removable cover plate 8 and is equipped with a knob 36. A bracket 37 secured to the partition 33 is provided with a backwardly bent portion 38 between which and the bracket proper 37, one end of the bimetal element 39 is clamped. This element forms a substantial horse shoe as shown in Figure 3 and has a spring contact 40 secured at its free end. This spring contact arm 40 has a leg portion 41 which is connected by the jumper 42 to the rod 13.

It will be observed that normally the bimetal element 39 is contracted with the spring contact 40 engaging the cam 30. As the device heats up, the bimetal element 39 will expand and at a predetermined temperature, the contact 40 will disengage itself from the cam 30. However, the temperature at which this cut off takes place can be minutely regulated by actuating the knob 36 and adjusting the cam-like structure 30.

While the foregoing specification sets forth the invention in specific terms, it is to be understood that numerous changes in the shape, size, and materials may be resorted to without departing from the spirit and scope of the invention as claimed hereinafter.

What is claimed is:

1. In a heating device of the character described comprising a core of insulation provided with external threads, a pair of conductor rods extending longitudinally in the core, one of said rods being provided with an opening at its inner end, for receiving one end of a heating element wound on the core, the other rod being provided with a plurality of openings longitudinally spaced therein, diametrically disposed and longitudinally spaced bores in the core, the openings of the last mentioned rods being registrable with the said diametrical bores, said last mentioned bores being selective to receive the other end of the heating element when the openings of the last mentioned rod are registering therewith, and means at the outer ends of the rods whereby the rods can be fed outwardly to bind the rods to the ends of the heating element.

2. In a heating device of the character described comprising a core of insulation provided with external threads, a pair of conductor rods extending longitudinally in the core, one of said rods being provided with an opening at its inner end for receiving one end of a heating element wound on the core, the other rod being provided with a plurality of openings longitudinally spaced therein, diametrically disposed and longitudinally spaced bores in the core, the openings of the last mentioned rods being registrable with the said diametrical bores, said last mentioned bores being selective to receive the other end of the heating element when the openings of the last mentioned rod are registering therewith, and means at the outer ends of the rods whereby the rods can be fed outwardly to bind the rods to the ends of the heating element, said means consisting in providing threads on the outer ends of the rods and nuts engaged on the threaded portions and feedable against the adjacent end of the core.

WALTER R. DAVIES.